United States Patent
Liu et al.

(10) Patent No.: US 8,120,648 B2
(45) Date of Patent: Feb. 21, 2012

(54) METHOD FOR DISPLAYING STEREOSCOPIC IMAGE

(75) Inventors: Yun-Cheng Liu, Banciao (TW);
Tung-Lin Hsieh, Jhongli (TW);
Ching-Chun Chiang, Kuei Shan Hsiang (TW)

(73) Assignee: Quanta Computer Inc., Kuei Shan Hsing, Tao Yuan Shien (TW)

( * ) Notice: Subject to any disclaimer, the term of this patent is extended or adjusted under 35 U.S.C. 154(b) by 1211 days.

(21) Appl. No.: 11/892,887

(22) Filed: Aug. 28, 2007

(65) Prior Publication Data
US 2008/0158347 A1 Jul. 3, 2008

(30) Foreign Application Priority Data
Dec. 29, 2006 (TW) .............................. 95150051 A

(51) Int. Cl.
*H04N 13/04* (2006.01)
(52) U.S. Cl. ........................................... 348/51; 348/42
(58) Field of Classification Search .................... 709/42, 709/51; 348/42, 51
See application file for complete search history.

(56) References Cited

U.S. PATENT DOCUMENTS

| | | | | |
|---|---|---|---|---|
| 5,825,456 A * | 10/1998 | Tabata et al. | .................. | 351/201 |
| 5,917,539 A * | 6/1999 | Sorensen et al. | ................ | 348/56 |
| 6,259,426 B1 | 7/2001 | Harada et al. | | |
| 7,091,931 B2 * | 8/2006 | Yoon | ................. | 345/9 |
| 7,277,121 B2 * | 10/2007 | Mashitani et al. | .............. | 348/51 |
| 2003/0048354 A1 * | 3/2003 | Takemoto et al. | .............. | 348/51 |
| 2003/0117396 A1 * | 6/2003 | Yoon | ............................. | 345/419 |
| 2004/0057612 A1 * | 3/2004 | Tabata | .......................... | 382/154 |
| 2006/0061652 A1 * | 3/2006 | Sato et al. | ........................ | 348/53 |
| 2006/0290778 A1 | 12/2006 | Kitaura et al. | | |
| 2007/0236493 A1 * | 10/2007 | Horiuchi et al. | .............. | 345/419 |
| 2009/0195643 A1 * | 8/2009 | Neuman | ......................... | 348/51 |
| 2011/0193860 A1 * | 8/2011 | Lee et al. | ...................... | 345/419 |

FOREIGN PATENT DOCUMENTS

| | | |
|---|---|---|
| CN | 1864415 A | 7/2004 |
| CN | 1643939 | 7/2005 |
| WO | WO 2004/030377 | 4/2004 |

OTHER PUBLICATIONS

English language translation of abstract of CN 1643939 (published Jul. 20, 2005).
English language translation of abstract of WO 2004/030377 (published Apr. 8, 2008, first page of publication).
Kanade, T., et al.; "A Stereo Matching Algorithm with an Adaptive Window: Theory and Experiment;" IEEE Transaction on Pattern Analysis and Machine Intelligence, vol. 16, No. 9, Sep. 1994; pp. 920-932.

* cited by examiner

*Primary Examiner* — Faruk Hamza
(74) *Attorney, Agent, or Firm* — Thomas|Kayden

(57) ABSTRACT

The invention discloses a method for displaying a stereoscopic image, wherein the stereoscopic image includes a first-eye image and a second-eye image. The method is to firstly calculate a shift of the first-eye image with respect to the second-eye image. Then, the method moves the first-eye image for a length of a shift. Afterward, the method outputs the moved first-eye image and the second-eye image to display the stereoscopic image. Thereby, the parallax of the stereoscopic image is adjusted, so as to enhance the synthesizing effect of the stereoscopic image created.

10 Claims, 6 Drawing Sheets

METHOD FOR DISPLAYING STEREOSCOPIC IMAGE

BACKGROUND OF THE INVENTION

1. Field of the Invention

The invention relates to a method for displaying a stereoscopic image, and more particularly, to a method for adjusting parallax so as to enhance the synthesizing effect of the stereoscopic image.

2. Description of the Prior Art

Generally, a stereoscopic image is constituted by two images from different angles of view. One image corresponds to a left-eye angle of view, and the other image corresponds to a right-eye angle of view. The image corresponding to the left-eye angle of view is called a left-eye image, and the image corresponding to the right-eye angle of view is called a right-eye image.

Please refer to FIG. 1. FIG. 1 shows a single-lens reflex camera 2 and a stand 4 of prior art for shooting stereoscopic images. As shown in FIG. 1, the left-eye image and the right-eye image can be provided by shooting with the single-lens reflex camera 2 and an appropriate stand 4. The stand 4 provides the single-lens reflex camera 2 with two different positions for shooting the left-eye image and the right-eye image respectively. Besides, if the camera used comes with two lenses (not shown in FIG. 1), both the left-eye image and the right-eye image can be taken with one shot.

When displaying a stereo image, the left eye of a viewer sees only the left-eye image while the right eye of the viewer sees only the right-eye image. Thereby, the viewer would have a stereoscopic sense of sight in the brain. While watching a stereoscopic image, the parallax between the left-eye image and the right-eye image affects the depth of field judged by the viewer, and improper parallax makes the viewer feel uncomfortable and suffers eye fatigue.

Therefore, a scope of the invention is to provide a method for displaying a stereoscopic image to solve the aforesaid problems.

SUMMARY OF THE INVENTION

A scope of the invention is to provide a method for displaying a stereoscopic image. The method adjusts the parallax to enhance the synthesizing effect of the stereoscopic image.

According to an embodiment of the invention, the method is used for displaying a stereoscopic image. The stereoscopic image comprises a first-eye image and a second-eye image. The method, firstly, performs the step of calculating a shift of the first-eye image with respect to the second-eye image. Next, the method performs the step of moving the first-eye image for a length of the shift. Finally, the method performs the step of outputting the moved first-eye image and the second-eye image to display the stereoscopic image. Thereby, the parallax of the stereoscopic image is adjusted so that the synthesizing effect of the stereoscopic image is enhanced.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
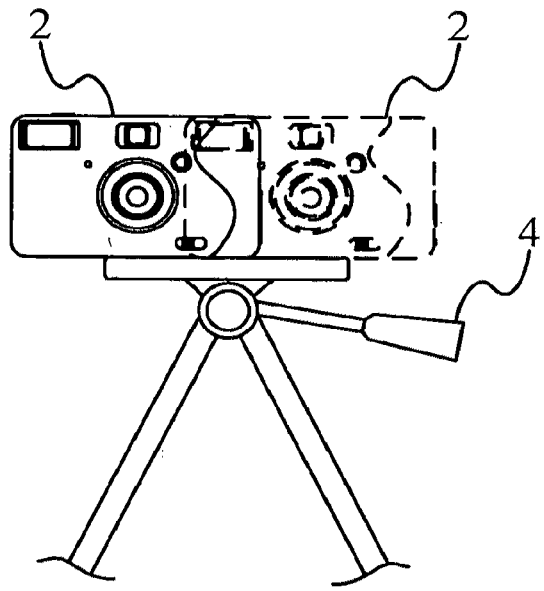
FIG. 1 shows a single-lens reflex camera and a stand of prior art for shooting stereoscopic images.
Figure 2:
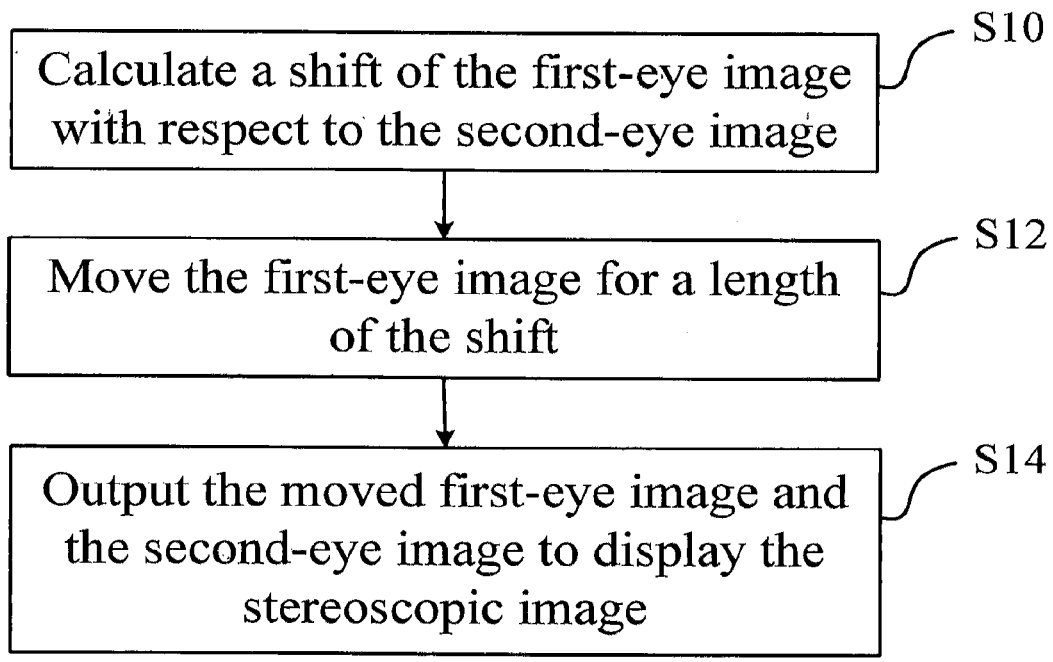
FIG. 2 shows a flow chart of the stereoscopic image display method according to an embodiment of the invention.

Please refer to FIG. 2. FIG. 2 shows a flow chart of the stereoscopic image display method according to an embodiment of the invention. In the embodiment, the method of the invention is used for displaying a stereoscopic image which includes a first-eye image and a second-eye image. As shown in FIG. 2, the method, firstly, performs step S10 to calculate a shift of the first-eye image with respect to the second-eye image. Next, the method performs step S12 to move the first-eye image for a length of the shift. Finally, the method performs step S14 to output the moved first-eye image and the second-eye image to display the stereoscopic image. In real applications, if the first-eye image is a right-eye image, the second-eye image is a left-eye image, and vice versa.

Figure 3:
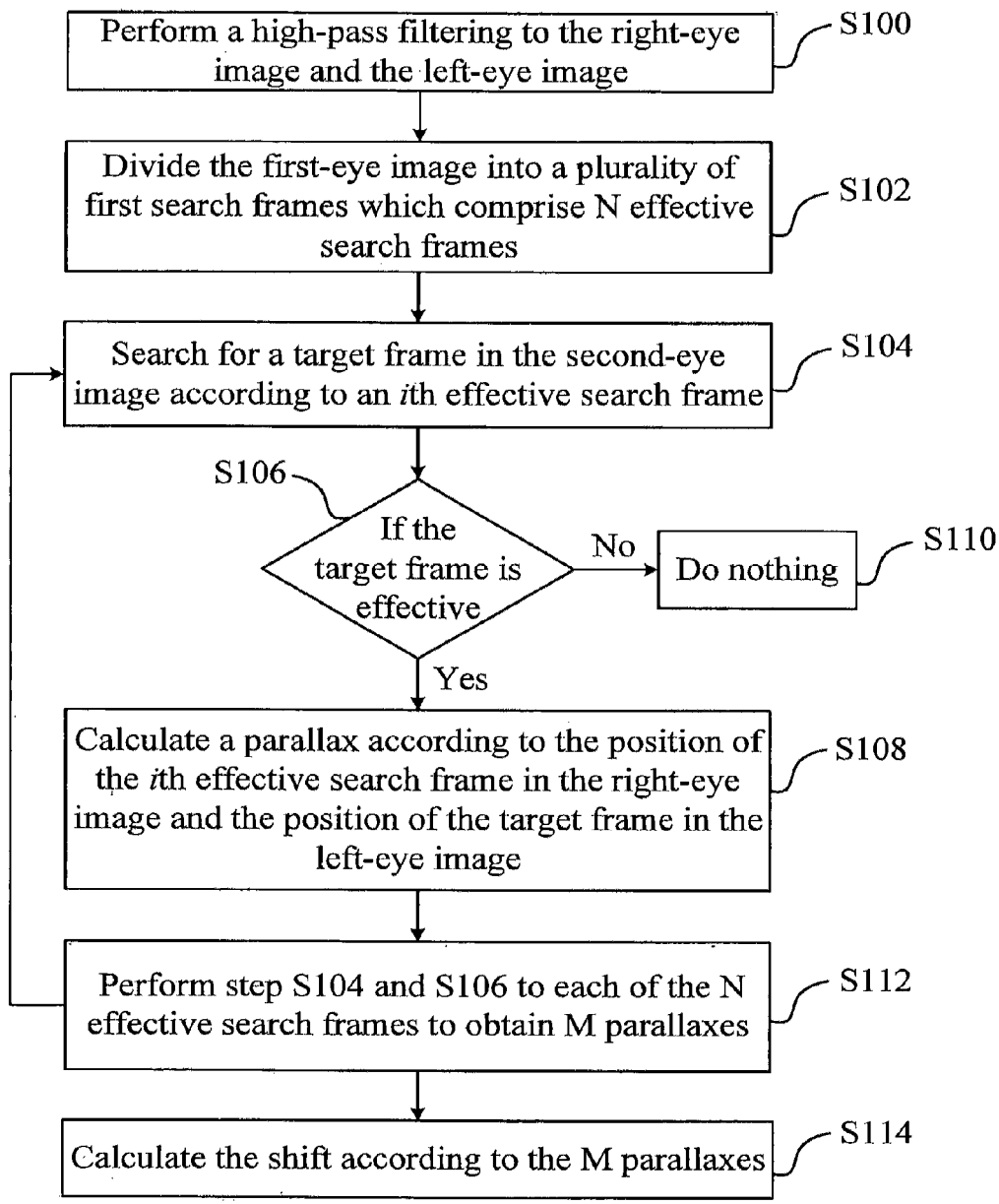
FIG. 3 shows a detailed flow chart of step S10 shown in FIG. 2.
Figure 4A:
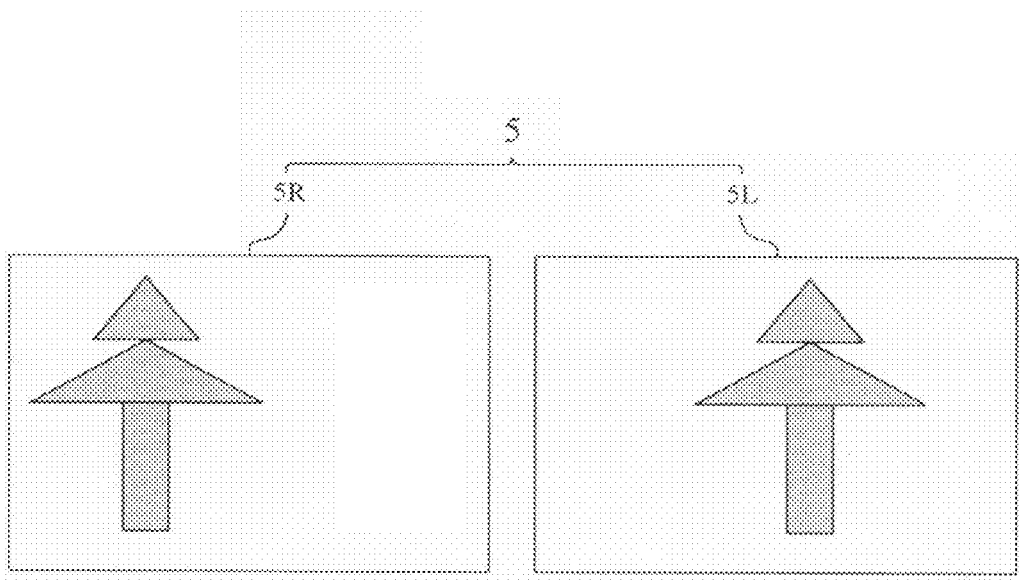
FIG. 4A shows the stereoscopic image.
Figure 4B:
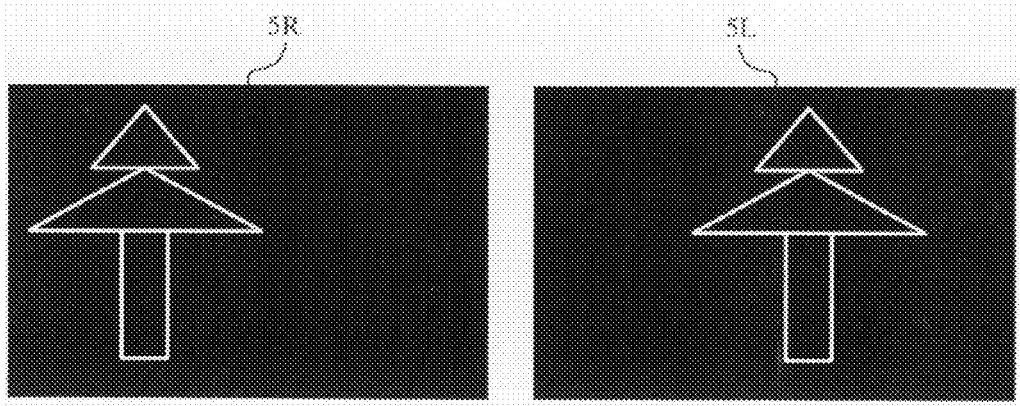
FIG. 4B shows the right-eye image and the left-eye image being high-pass filtered.
Figure 4C:
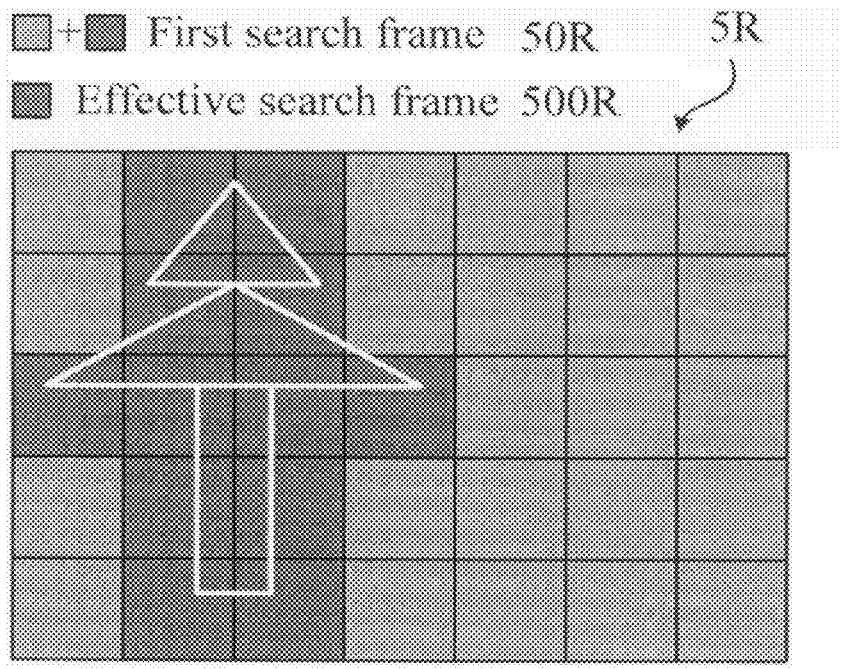
FIG. 4C shows the right-eye image shown in FIG. 4B being divided into a plurality of first search frames.

Please refer to FIG. 3 to FIG. 4C. FIG. 3 shows a detailed flow chart of step S10 shown in FIG. 2. FIG. 4A shows the stereoscopic image 5. FIG. 4B shows the right-eye image 5R and the left-eye image 5L being high-pass filtered. FIG. 4C shows the right-eye image 5R shown in FIG. 4B being divided into a plurality of first search frames 50R. In the embodiment, the stereoscopic image 5 includes a right-eye image 5R and a left-eye image 5L.

As shown in FIG. 3, the method, firstly, performs step S100 to perform a high-pass filtering to the right-eye image 5R and the left-eye image 5L. Next, the method performs step S102 to divide the right-eye image 5R into a plurality of first search frames 50R, which include N effective search frames 500R, where N is a natural number.

Afterward, the method performs step S104 to search for a target frame in the left-eye image 5L according to an ith effective search frame, where i is an integer ranging from 1 to N.

Then, the method performs step S106 to judge whether the target frame is effective, if YES, the method performs step S108 to calculate a parallax according to the position of the ith effective search frame in the right-eye 5R image and the position of the target frame in the left-eye image 5L, if NO, the method performs step S110 to do nothing.

Next, the method performs step S112 to perform step S104 to step S106 repetitively to each of the N effective search frames to obtain M parallaxes, where M is an integer ranging from 1 to N.

Finally, the method performs step S114 to calculate the shift according to the M parallaxes. In real applications, the shift can be an average of the M parallaxes or a median of the M parallaxes.

Figure 5:
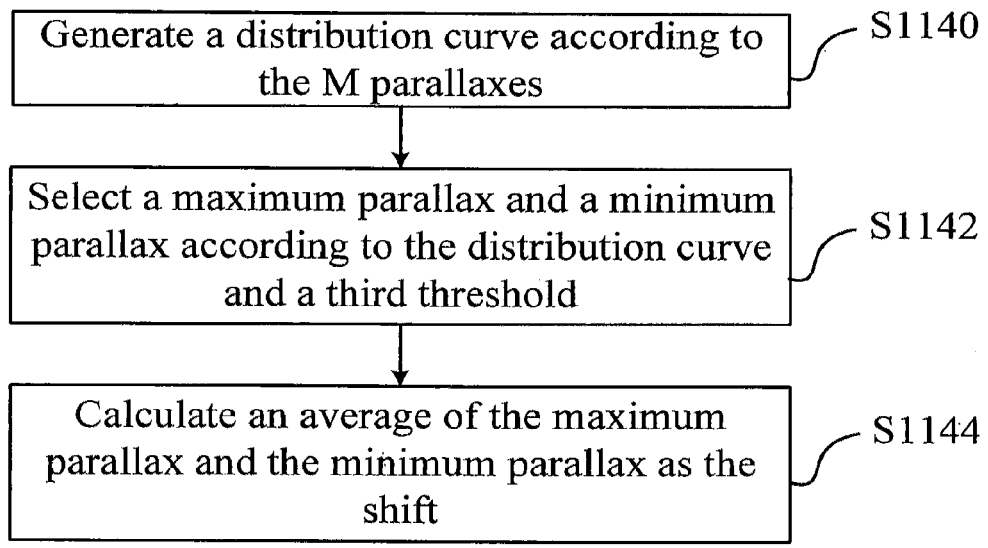
FIG. 5 shows the detailed flow chart of step S114 according to another embodiment of the invention.
Figure 6:
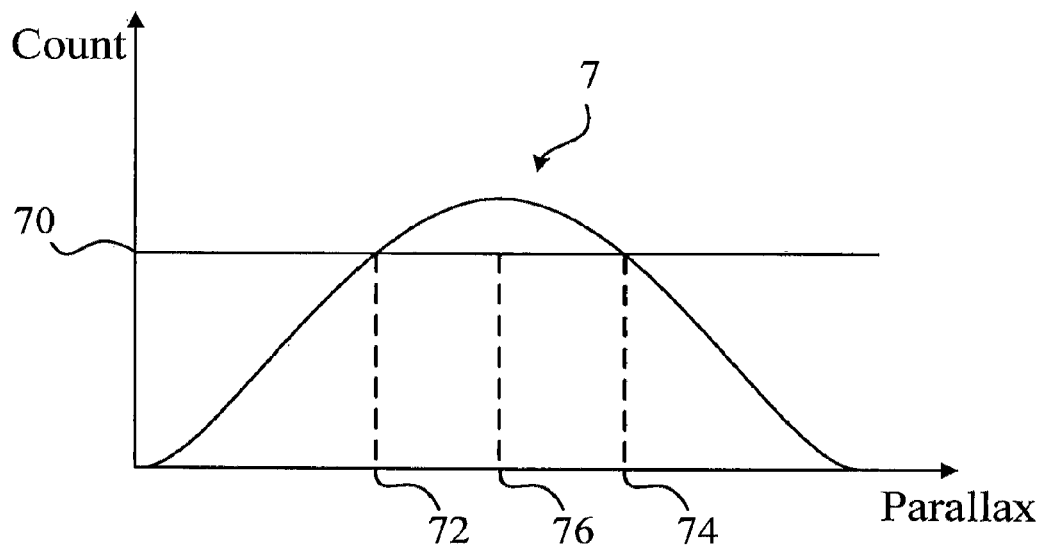
FIG. 6 shows the distribution curve of the parallaxes.

Please refer to FIG. 5 and FIG. 6. FIG. 5 shows the detailed flow chart of step S114 according to another embodiment of the invention. FIG. 6 shows the distribution curve 7 of the parallaxes. As shown in FIG. 5, the method, firstly, performs step S1140 to generate a distribution curve 7 according to the M parallaxes. Next, the method performs step S1142 to select a maximum parallax 74 and a minimum parallax 72 according to the distribution curve 7 and a third threshold 70. Finally, the method performs step S1144 to calculate an average 76 of the maximum parallax 74 and the minimum parallax 72 as the shift. It should be noted that the third threshold 70 could be decided by the designer for actual applications.

Figure 7:
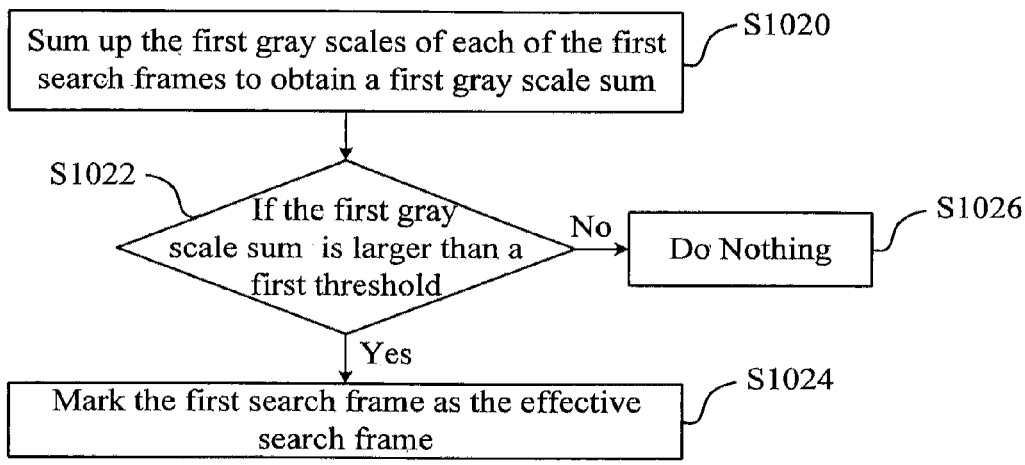
FIG. 7 shows the detailed flow chart of step S102 shown in FIG. 3.

In the embodiment, each of the first search frames individually comprises a plurality of first pixels which each individually has a first gray scale. Please refer to FIG. 7. FIG. 7 shows the detailed flow chart of step S102, which is previously shown in FIG. 3. As shown in FIG. 7, the method, firstly, performs S1020 to sum up the first gray scales of each of the first search frames to obtain a first gray scale sum. Then, the method performs step S1022 to judge whether the first gray scale sum of each of the first search frames is larger than a first threshold, if YES, the method performs step S1024 to mark the first search frame as the effective search frame 500R, if NO, the method performs step S1026 to do nothing. It should be noted that the first threshold can be decided by the designer to meet designing requirements.

Figure 8:
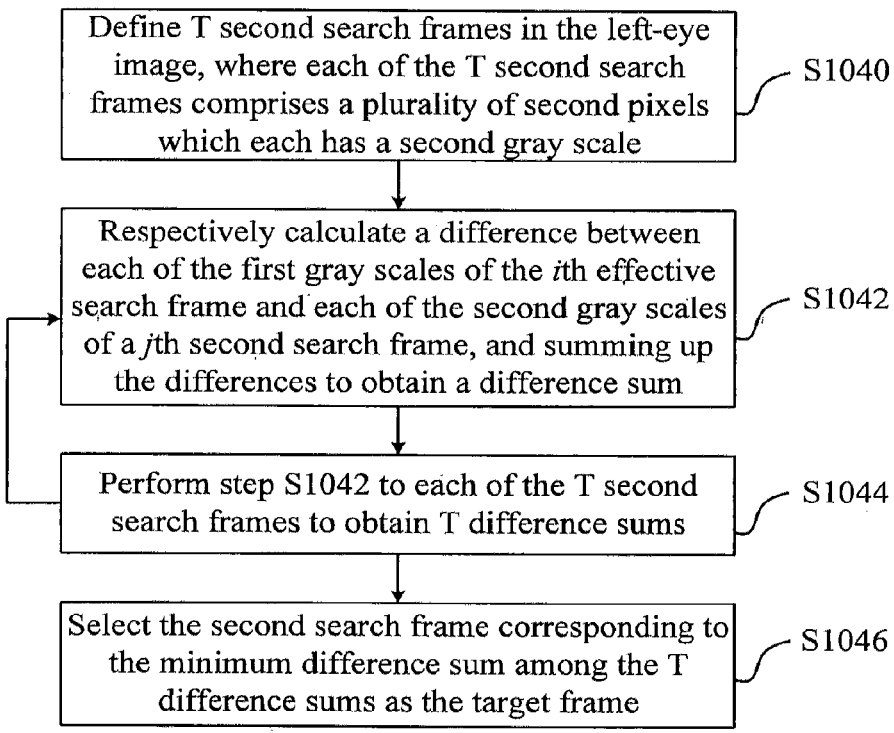
FIG. 8 shows the detailed flow chart of step S104 shown in FIG. 3.

Please refer to FIG. 8. FIG. 8 shows a detailed flow chart of step S104, which is previously shown in FIG. 3. As shown in FIG. 8, the method, firstly, performs step S1040 to define T second search frames in the left-eye image, where T is a natural number. Each of the T second search frames comprises a plurality of second pixels which each has a second gray scale. Then, the method performs step S1042 to respectively calculates a difference between each of the first gray scales of the ith effective search frame and each of the second gray scales of a jth second search frame, and to sum up the differences to obtain a difference sum, where j is an integer ranging from 1 to T. Afterward, the method performs step S1044 to perform step S1042 repetitively to each of the T second search frames to obtain T difference sums. Finally, the method performs step S1046 to select the second search frame as the target frame which corresponds to the minimum difference sum among the T difference sums.

In real applications, the second search frames could be defined as all search frames in the left-eye image 5L, which share the same size as that of the ith effective search frame. In addition, the second search frames could also be defined as all search frames in the left-eye image 5L which not only share the same size as that of the ith effective search frame, but they also share the same vertical position in the left-eye image 5L with that of the ith effective search frame in the right-eye image 5R.

Figure 4D:
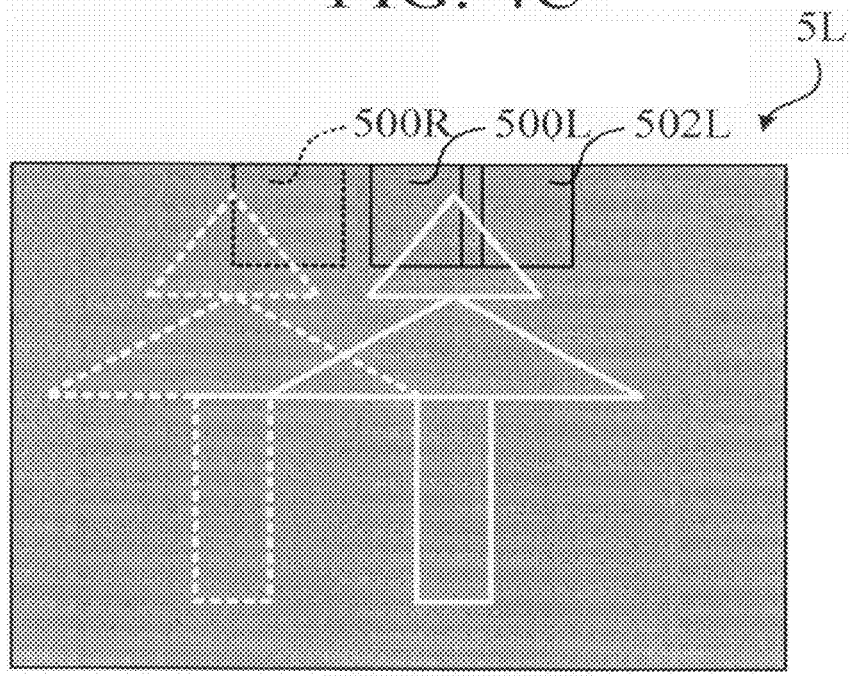
FIG. 4D shows the exampled second search frames defined in the left-eye image.

Please refer to FIG. 4D. FIG. 4D shows the exampled second search frames defined in the left-eye image 5L. As shown in FIG. 4, the second search frames 500L and 502L are two examples of the second search frames according to the ith effective search frame 500R. It has to be noted that it is possible for the second search frames to overlap.

In the embodiment, step S106 shown in FIG. 3 can further include the step of judging whether the difference sum corresponding to the target frame is smaller than a second threshold, if YES, the method marks the target frame as effective, if NO, the method does nothing. It should be noted that the second threshold can be decided by the designers based on real applications.

In the embodiment, step S108 shown in FIG. 3 can further include the step of normalizing each of the M parallaxes, such as dividing each of the M parallaxes by a width of the stereoscopic image 5 to obtain M normalized parallaxes. Thereby, the method of the invention can be applied to stereoscopic images of different formats.

In comparison with prior art, the method of the invention adjusts the parallax by moving the first-eye image (the right-eye image or the left-eye image) for a length of a shift so as to enhance the synthesizing effect of the stereoscopic image.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for displaying a stereoscopic image, the stereoscopic image comprising a first-eye image and a second-eye image, the method comprising steps of:
   (a) dividing the first-eye image into a plurality of first search frames, the first search frames comprising N effective search frames, N being a natural number;
   (b) searching for a target frame in the second-eye image according to each of the effective search frames in the first-eye image;
   (c) calculating a parallax according to the position of each of the effective search frames in the first-eye image and the position of the corresponding target frame in the second-eye image;
   (d) calculating a shift of the first-eye image with respect to the second-eye image according to the parallaxes;
   (e) moving the first-eye image for a length of the shift; and
   (f) outputting the moved first-eye image and the second-eye image to display the stereoscopic image;
   wherein before the step (a), the method further comprises performing a high-pass filtering to the first-eye image and the second-eye image;
   the step (b) further comprises (b1) searching for the corresponding target frame in the second-eye image according to an ith effective search frame, i being an integer ranging from 1 to N;
   the step (c) further comprises:
   (c1) judging whether the target frame is effective, if YES, calculating a the corresponding parallax according to the position of the ith effective search frame in the first-eye image and the position of the corresponding target frame in the second-eye image; and
   (c2) performing the steps (b1) and (c1) to each of the N effective search frames to obtain M parallaxes, M being an integer ranging from 1 to N; and the step (d) further comprises (d1) calculating the shift according to the M parallaxes.

2. The method of claim 1, wherein the first-eye image is a right-eye image and the second-eye image is a left-eye image.

3. The method of claim 1, wherein the first-eye image is a left-eye image and the second-eye image is a right-eye image.

4. The method of claim 1, wherein each of the first search frames individually comprises a plurality of first pixels which each individually has a first gray scale, step (a) further comprises steps of:
   (a1) summing up the first gray scales of each of the first search frames to obtain a first gray scale sum; and
   (a2) judging whether the first gray scale sum of each of the first search frames is larger than a first threshold, if YES, marking the first search frame as the effective search frame.

5. The method of claim 4, wherein step (b1) further comprises steps of:

(b11) defining T second search frames in the second-eye image, each of the T second search frames comprising a plurality of second pixels which each has a second gray scale, T being a natural number;

(b12) respectively calculating a difference between each of the first gray scales of the ith effective search frame and each of the second gray scales of a jth second search frame, and summing up the differences to obtain a difference sum, j being an integer ranging from 1 to T;

(b13) performing step (b12) to each of the T second search frames to obtain T difference sums; and (b14) selecting the second search frame corresponding to the minimum difference sum among the T difference sums as the target frame.

6. The method of claim 5, wherein step (c1) further comprises step of:

judging whether the difference sum corresponding to the target frame is smaller than a second threshold, if YES, marking the target frame as effective.

7. The method of claim 1, wherein step (c2) further comprises a step of normalizing the M parallaxes.

8. The method of claim 1, wherein step (d1) further comprises a step of calculating an average of the M parallaxes as the shift.

9. The method of claim 1, wherein step (d1) further comprises a step of selecting a median from the M parallaxes as the shift.

10. The method of claim 1, wherein step (d1) further comprises steps of:

(d11) generating a distribution curve according to the M parallaxes;

(d12) selecting a maximum parallax and a minimum parallax according to the distribution curve and a third threshold; and (d13) calculating an average of the maximum parallax and the minimum parallax as the shift.

* * * * *